(No Model.)
J. J. C. & M. SMITH.
MULTIPLE ELECTRIC CABLE.
No. 343,082. Patented June 1, 1886.
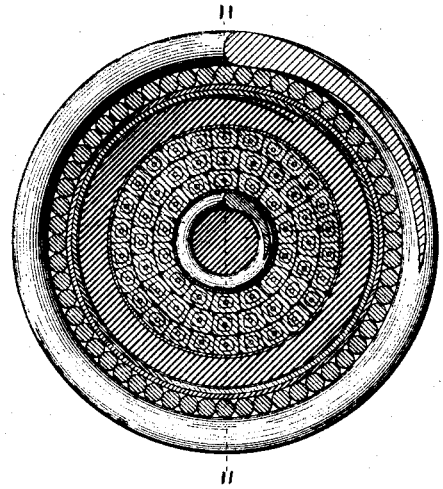
FIG. I.
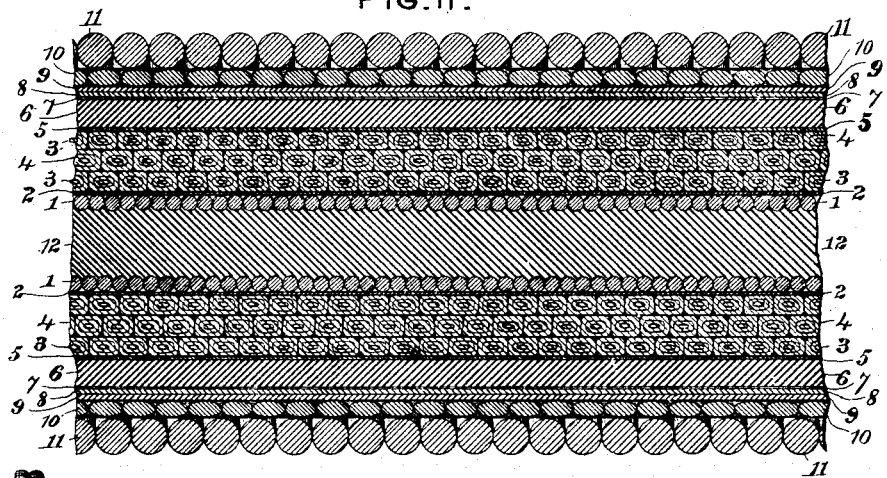
FIG. II.
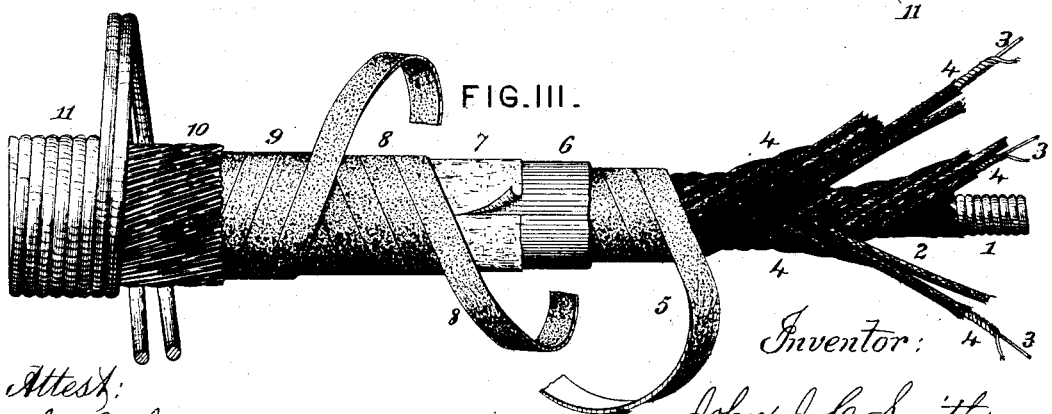
FIG. III.
Attest:
Geo. T. Smallwood
Edward Star
Inventor:
John J. C. Smith
Michael Smith
By Knight Bros
attys
N. PETERS, Photo-Lithographer, Washington, D. C.

UNITED STATES PATENT OFFICE.

JOHN JOSEPH CHARLES SMITH AND MICHAEL SMITH, OF PASSAIC, NEW JERSEY; SAID JOHN JOSEPH CHARLES SMITH ASSIGNOR TO JOHN H. CHEEVER, OF NEW YORK, N. Y.

MULTIPLE ELECTRIC CABLE.

SPECIFICATION forming part of Letters Patent No. 343,082, dated June 1, 1886.

Application filed September 5, 1885. Serial No. 176,259. (No model.)

*To all whom it may concern:*

Be it known that we, JOHN JOSEPH CHARLES SMITH and MICHAEL SMITH, citizens of the United States, residing at Passaic, in the county of Passaic and State of New Jersey, have invented a new and useful Improvement in the Construction of Multiple Electric Conductors or Cables for Telegraphic and Telephonic Purposes, of which the following is a specification.

The object of this invention is the construction of a cable for underground, submarine, and aerial uses; and the invention consists in combining a number of electric conductors laid on a hollow core, each conductor being insulated from the others effectually for all practical purposes; then inclosing the combined conductors in an effective water-proof insulating covering to exclude not only moisture, but also as far as possible all influences of electric or magnetic currents on the conductors from exterior influence; and, lastly, protecting the several conductors and the aforesaid external insulation covering by an armor of spiral-wound iron wire for the purpose of preventing mechanical injuries, and admitting of placing the conductor underground without the expense of a costly conduit, said armor being of special construction to increase at once its flexibility and its efficiency for protection against injury.

By this invention we produce a cable consisting of a great number of electric conductors at a comparatively low cost, and of high insulation for each separate conductor, and a cable of comparatively small bulk, protected in such a manner that it can be placed underground without great cost or extra preparation.

The most desirable properties in an electric cable for underground use are as follows: First, effectual insulation of each conductor; second, effective outside insulation for the combined conductors; third, absolute external protection against influence of moisture in combination with high insulating qualities; fourth, a serviceable outside protection against mechanical injuries, permitting the laying of the cable underground without special conduits; fifth, great strength, flexibility, and small bulk, combined with great durability; sixth, economy in cost without diminishing durability, high insulation, and other qualities named above.

Our invention combines the above desirable qualities, and will now be described with reference to the accompanying drawings, in which—

Figure I shows an enlarged cross-section of the cable; Fig. II, a longitudinal section cut on the line II II, Fig. I. Fig. III is an elevation on a smaller scale with the parts of the cable separated.

In order to guard against misunderstanding of the principle and nature of our invention we will state at the outset that some manipulations in the making of our cable are not new; but our combination of the old with our new features forms a novel and valuable system of making a cable of a number of insulated electric conductors. The center of the cable is formed of a hollow core, 1, for which we may use a perforated lead pipe of about three-eighths inch outside diameter and one-fourth inch bore; but we prefer a flexible metallic tube which we form by winding a No. 14 wire to a close spiral as long as the desired length of cable. This wire tube is covered with a layer of cotton thread, 2, by means of braiding.

The new and useful functions of this flexible tube forming the center of our cable will be fully understood when we have proceeded further with this specification.

The conductors to be formed into a cable are copper wires 3, which are covered with two or more layers of cotton thread, 4—one layer by winding, the next by braiding. The covered wires 3 are then laid around the above-described covered spiral tube by means of a cabling-machine in sufficient numbers to fully surround the flexible tube. To insure uniform flexibility to the cable the covered conducting-wires are of course laid in a long winding spiral around the center core. The first layer is then followed by a second layer of such cotton-covered wire wound round the center in the opposite direction. The second layer may be followed by a third, and this by a fourth, according to the number of conductors required in the cable. When the desired number of conductors are thus laid up in a cable, we surround and bind the whole together by a layer of tape, 5, made from cotton cloth which is covered over on one side with rubber compound. The cloth side of the tape is laid next to the wires, the rubber-covered side coming to the outside surface, so as to prevent cohesion to the coverings of the individual wires. We next proceed to cover the cable with a layer of insulating-rubber compound, 6, about one-sixteenth inch thick. This layer of compound is applied longitudinally in the manner and with a machine similar to that used in applying the rubber covering to single conductors, as described in Letters Patent Nos. 276,724 and 276,727, granted to J. J. C. Smith the 1st day of May, 1883, and in connection with and by the aid of metal foil 7, as described in Letters Patent No. 317,587, granted, jointly, to J. J. C. Smith and Michael Smith the 12th day of May, 1885. When this outside insulating-rubber compound covering is applied, as aforesaid, we leave the tin or metal foil thereon and proceed to apply another layer of tape, 8, (covered on both sides with rubber compound,) over the tin-foil 7. The tape is wound spirally around the cable. This layer of tape is followed by a second one, 9, wound in an opposite direction, so as to cross the joints of the tape. When these two layers of tape are applied, the cable is far enough advanced in its construction to be ready for a partial vulcanization of the insulating rubber covering of the cable. This is done by winding the cable on a large drum and placing the drum and cable into a proper vulcanizing-vessel. The drum is slowly revolved during the time of vulcanization. The heat is produced by steam at a temperature of 250° for forty minutes. Let us state here that the greatest care must be exercised to close the ends of the cable hermetically at both ends in such a manner as to prevent the steam from entering the inside of the cable and moistening the cotton covering of the separate conductors. The reason for this precaution will be hereinafter explained. The cable being removed from the vulcanizer, now possesses the following features, namely: First, a hollow flexible center, such center having numerous openings in its sides or walls; second, a series of wires, each separated from the other by cotton, but all of them firmly secured together and surrounded by an insulating covering of rubber compound, which constitutes not only an outside insulator of the several conductors, but also an exceedingly flexible and absolutely water-proof covering, which is further guarded by the layer of metallic foil lying longitudinally outside of the rubber covering and protected by a double layer of tape.

The next operation we perform is to surround the cable by a double armor. This armor is laid on somewhat differently from the way in which it is generally done. Usually armors are laid on longitudinally, wound in long turns. We first put on a covering or armor, 10, consisting of a great number of fine iron wires, all of which we wind at once spirally round the cable, making one turn to about every five or six inches, closely enough to cover the surface of the cable completely. This first armor is succeeded by a second one, 11, consisting of two heavier wires of about one-eighth inch in diameter. These two wires are wound side by side over the first armor in regular spiral turns, covering the cable solidly and completely, but, nevertheless, making a very flexible cable. The object of this double armor is to serve two very important purposes, as explained hereinafter. When the cable is armored, we proceed to fill the interior space left between the wires, cotton, and covering with a good insulating material, 12, which will become fluid by heat and solidifies at a temperature of about 140°. For this filling paraffine, rosin, &c., may be used; but we prefer either ozocerite or earth-wax, or a mixture of two parts ozocerite with two parts rosin and one part dissolved rubber in benzine, mixed with the ozocerite and rosin when melted. The filling of the cable with said mixture we accomplish in this manner: The cable is wound on a large drum, and each end of the cable is provided with a proper metallic coupling. The coupling at one end is so arranged as to quickly and perfectly connect the hollow core of the cable with supply-pipes from two force-pumps, one being an air-pump the other a pump for the liquid-insulating material. The other end of the cable is connected with a suction air-pump. When the cable is so arranged, we force hot dry air through the interior of the cable, which passes freely through the central hollow core, and as the walls of the flexible tube permit a free escape of the air, it passes freely through the interstices of the cotton surrounding each wire. The hot air is passed through to heat up the wires and cotton and make the cotton perfectly dry. This is kept up for about half an hour. Then the air is shut off. The air-exhaust pump on the other end of the cable is then set in operation, which will quickly remove the air from the interior of the cable. When the air is exhausted, the force-pump which is connected with a vessel containing a supply of melted ozocerite is brought in connection with the end of the cable, and the interior of the cable is completely filled with the melted ozocerite. Pressure is applied to the melted ozocerite by means of the force-pump, which may be brought to about two hundred pounds to the square inch, so as to make sure that the ozocerite will penetrate into every interstice and pore which may exist between the wires, threads of cotton and the outside covering. When this is done, the cable is allowed to cool off to solidify the ozocerite, and is ready for use.

The cable constructed as above described will be seen to possess the following features of practical utility:

First. The flexible hollow center having numerous openings in its walls affords the greatest facility for injecting the melted insulating compound. From the center of the cable to the outside covering is a distance of less than one inch, even in a thick cable. Therefore the fluid insulating material will quickly and surely reach every point, while the hollow passage in the flexible core permits a quick flow of the melted insulating material from one end of the cable to the other.

Second. The outside solid rubber covering lies firmly round the several conductors. This prevents the escape of the melted insulating compound when pressure is applied to it, and performs the other important function of being a good outside insulator of the several conductors.

Third. The armor serves two important functions: first, during the process of filling the cable with the melted insulating compound it strongly surrounds the cable and the outside insulating-rubber cover, forming a sure safeguard against the bursting of the rubber covering when the required high pressure is applied to the hot and fluid material injected; second, the armor is a complete and safe protection of the cable against mechanical injuries. The cable can be laid underground without a special conduit with perfect safety, and will possess as great durability as a solid pipe.

Fourth. The manner in which we lay our armor imparts great flexibility to the cable. By laying a double armor of different twists and thicknesses it is caused to lie solidly to the cable, and is much better adapted to resist any blow from a pick or shovel should any digging be done in the streets where such a cable is buried.

If a cable is required for aerial purposes, where lightness is an essential point, we apply a strong hemp cover in place of the iron-wire armor.

We are well aware that cables of electric conductors are formed by drawing a number of cotton-covered wires, first formed in a cable, in a lead or other metallic pipe, leaving enough room between the walls of the pipe and cable to admit the melted paraffine, which is forced in to fill the space and interstices between the cotton and wire. The more suitable pipes for such purposes are lead pipes. Cables made in this manner present several very objectionable features in practical use. Lead pipe is very heavy, and on account of its softness very easily injured and cut through, especially so if it is drawn into a long and narrow conduit. Once injured or cut the moisture will soon reach the wires, and the paraffine-saturated cotton cover forms only a good insulator while it is not broken or disturbed.

In filling the cable with paraffine only moderate pressure can be applied to a hot lead pipe, so that it shall not enlarge or burst altogether. Therefore the cotton fibers cannot be so highly saturated. Furthermore, by drawing a cable into a lead pipe having more space than is required by the cable it must necessarily touch the wall of the pipe on one side or the other, thus making the filling thick on one side, while on the other the wires and lead pipe are in proximity. A metallic pipe is a conductor of electricity. The inside conductors lie too close to it and nothing between them but a thin layer of cotton threads saturated with paraffine or some such material. The earth and outside electric currents have too great an influence on the lead pipe and the inclosed conductors of the cable. Lastly, if a cable inclosed in a lead pipe in the manner stated is bent or coiled, which necessarily must be done quite often before it is laid, every bend will and must move the structure of the metal. The metal being inelastic, moves and acts on the paraffine filling, which fractures the same. Even though imperceptible, these fractures are injurious to the insulation.

It is easily seen that our cable possesses all the required properties to avoid the stated difficulties.

The process of making our improved cable is made the subject of a separate application for Letters Patent, Serial No. 176,258, filed September 5, 1885.

Having thus described our invention, the following is what we claim as new therein and desire to secure by Letters Patent:

1. The combination of the hollow spiral core 1, insulated conducting-wires 3, impervious envelope 6, and a filling of wax or other fusible insulating material.

2. The combination of a flexible hollow core adapted to permit the passage of melted insulating material, covered wires surrounding the said core, and an envelope composed of insulating and fibrous material and sheet metal, the fibrous material being united to the insulating-envelope in process of vulcanization and preventing cohesion between the same and the covers of the individual wires.

3. The protecting armor consisting of diversely-wound spiral wires 10 11, as explained, in combination with the hollow core 1, covered wires 3, and insulating-envelope 6, as and for the purposes set forth.

4. The electric cable herein described, consisting of the hollow flexible core 1 adapted to permit the passage of melted insulating material, the covered wires 3, surrounding said core, the impervious envelope 6 7 8, surrounding said wires, the flexible armor 10 11, and the fusible non-conducting filling 12, as and for the purposes set forth.

JOHN JOS. CHAS. SMITH.
MICHAEL SMITH.

Witnesses:
JOHN B. PUDNEY,
EUGENE C. SMITH.